(12) United States Patent
Tran et al.

(10) Patent No.: US 10,669,778 B2
(45) Date of Patent: Jun. 2, 2020

(54) PRESSURE SYSTEM FOR BEARING ASSEMBLY AND METHOD OF USE

(71) Applicant: Schlumberger Technology Corporation, Sugar Land, TX (US)

(72) Inventors: Lap Tran, Cypress, TX (US); Michael Sawyer, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 183 days.

(21) Appl. No.: 16/072,861

(22) PCT Filed: Jan. 24, 2017

(86) PCT No.: PCT/US2017/014645
§ 371 (c)(1),
(2) Date: Jul. 25, 2018

(87) PCT Pub. No.: WO2017/132104
PCT Pub. Date: Aug. 3, 2017

(65) Prior Publication Data
US 2018/0371838 A1    Dec. 27, 2018

Related U.S. Application Data

(60) Provisional application No. 62/286,464, filed on Jan. 25, 2016.

(51) Int. Cl.
*E21B 4/00* (2006.01)
*F16C 32/06* (2006.01)
*F16C 33/66* (2006.01)

(52) U.S. Cl.
CPC .......... *E21B 4/003* (2013.01); *F16C 32/0648* (2013.01); *F16C 33/6659* (2013.01); *F16C 2352/00* (2013.01)

(58) Field of Classification Search
CPC .. E21B 4/003; F16C 32/0648; F16C 33/6659; F16C 2352/00; F16C 33/6637
See application file for complete search history.

(56) References Cited

U.S. PATENT DOCUMENTS 5,048,981 A    9/1991   Ide
7,926,593 B2*  4/2011   Bailey ................... E21B 21/001
                                                          175/87

(Continued)

OTHER PUBLICATIONS

International Preliminary Report on Patentability for the equivalent International patent application PCT/US2017/014645 dated Aug. 9, 2018.

(Continued)

*Primary Examiner* — David J Bagnell
*Assistant Examiner* — Yanick A Akaragwe
(74) *Attorney, Agent, or Firm* — Jeffrey D. Frantz

(57) ABSTRACT

A bearing pressure system includes a bearing assembly having a first component movable against a second component and at least one accumulator in fluid communication with an interface between the first and second components, the at least one accumulator holding a pressurized fluid. A method includes providing a bearing pressure system having a fluid communicable between an accumulator and an interface between components movable relative to each other, providing an amount of pressurized fluid from the accumulator to the interface when the pressure of the fluid at the interface falls below a pressure range being maintained, and transferring an amount of the fluid from the interface to the accumulator when the pressure of the fluid at the interface rises above the pressure range being maintained.

16 Claims, 6 Drawing Sheets

(56) References Cited

U.S. PATENT DOCUMENTS

| | | |
|---|---|---|
| 10,240,426 B2 * | 3/2019 | Grace .................... E21B 23/04 |
| 2007/0048147 A1 | 3/2007 | Dunn |
| 2008/0085071 A1 | 4/2008 | Garncarz |
| 2010/0144476 A1 * | 6/2010 | Stephens ................. B60K 6/12 |
| | | 475/1 |
| 2010/0326730 A1 | 12/2010 | Prill et al. |
| 2011/0036638 A1 | 2/2011 | Sokol et al. |

OTHER PUBLICATIONS

International Search Report and Written Opinion for the equivalent International patent application PCT/US20171014645 dated May 19, 2017.

* cited by examiner

PRESSURE SYSTEM FOR BEARING ASSEMBLY AND METHOD OF USE

The present document is based on and claims priority to U.S. Provisional Application Ser. No. 62/286,464, filed Jan. 25, 2016, which is incorporated herein by reference in its entirety.

BACKGROUND

Bearing assemblies having at least two parts moving against each other are often supplied with a lubricant for aiding the movement of the parts against each other. The lubricant may be self-contained between the moving parts, for example, by sealing lubricant between the moving parts using at least one sealing element. In some bearing assemblies, lubricant may be constantly or intermittently supplied from a lubricant source to an interface between the moving parts.

Some bearing assemblies include moving parts provided with interfacing reduced-friction surfaces. Reduced-friction surfaces may include diamond, diamond-like carbon, disulfides, and/or carbides, for example. Further, reduced-friction surfaces may be applied as a coating (applying a layer of the reduced-friction material over an outer surface of an already formed part) or may be formed as an outer surface of a part, for example, by polishing or by forming the outer surface of the part with a reduced-friction material during manufacturing or making of the part.

An example of a bearing assembly is a bearing package provided in a rotating control device (RCD) for use during downhole drilling operations. An RCD (also referred to as a rotating control head, RCH) includes a bearing and sealing assembly that enables rotation of a drill string and longitudinal motion of a drill string as a wellbore is drilled, while maintaining a fluid-tight seal between the drill string and the wellbore so that drilling fluid discharged from the wellbore may be discharged in a controlled manner. By controlling discharge of the fluid from the wellbore, a selected fluid pressure may be maintained in the annular space between the drill string and the exterior of the wellbore.

RCDs may be provided along a casing or riser assembly, through which the drill string may be inserted and rotated during the drilling operations. A bearing package may be provided within the RCD to allow rotation of the drill string through one or more sealing or packing elements in the RCD, where the bearing package and sealing element(s) together seal-off drilling fluids from moving through the RCD. An RCD bearing package may include an inner rotatable part commonly referred to as a drive ring or a quill and an outer stationary part, which may be referred to as the outer housing or bearing housing. The interfacing surfaces between the drive ring and the bearing housing may include one or more reduced-friction surfaces. Further, RCD bearing packages may include lubricant provided between the interfacing surfaces of the drive ring and bearing housing to aid in rotation of the drive ring within the bearing housing.

DETAILED DESCRIPTION

Figure 1:
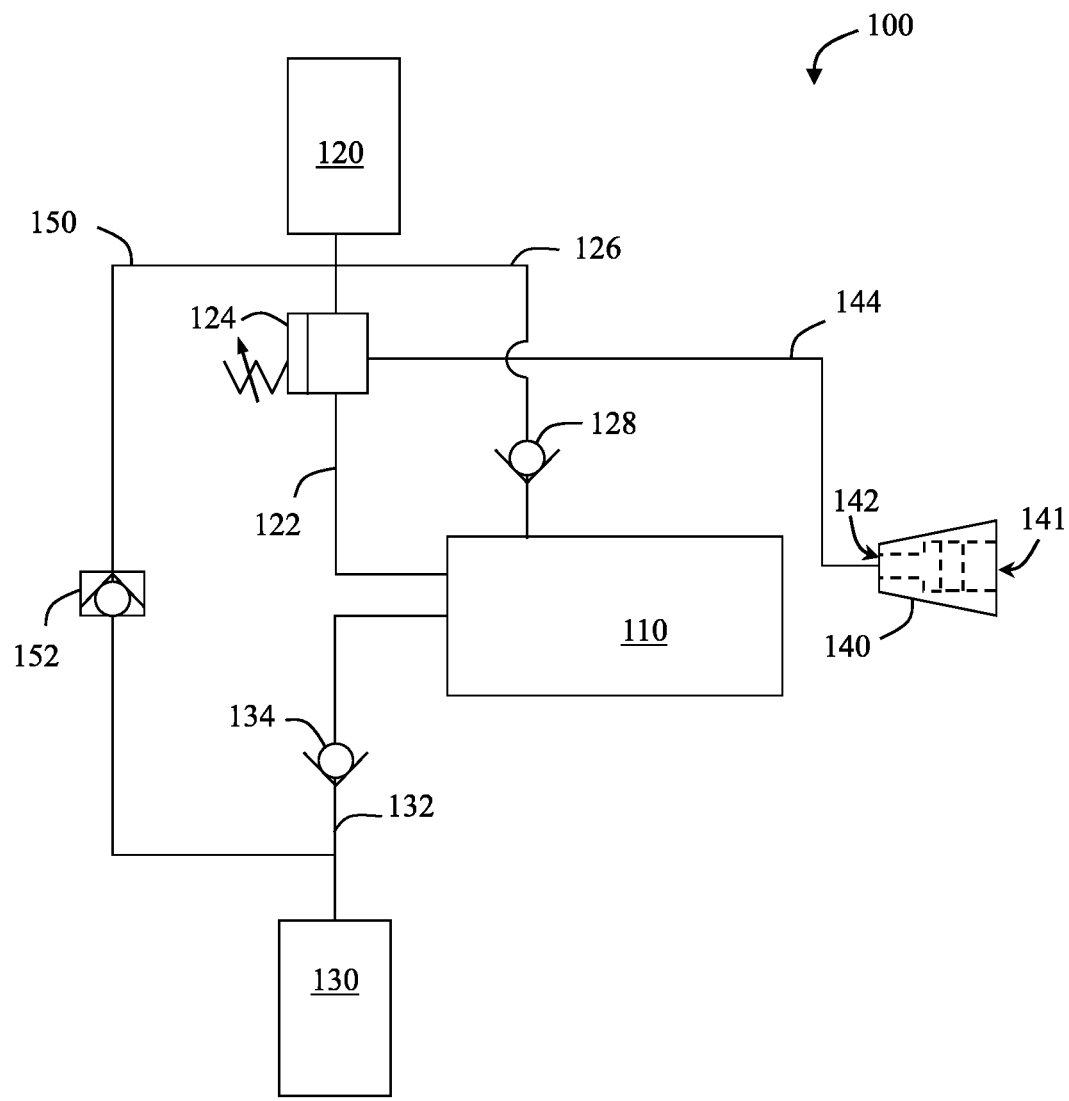
FIG. 1 shows a schematic of a bearing pressure system according to embodiments of the present disclosure.

Embodiments of the present disclosure relate generally to bearing pressure systems and apparatuses used in such systems. Bearing pressure systems according to embodiments of the present disclosure may be used, for example, in bearing packages of rotating control devices (RCD).

Bearing pressure systems according to embodiments of the present disclosure may be used in connection with a bearing assembly having a first component movable against a second component, for maintaining a desired pressure range within the bearing assembly. For example, a bearing assembly may have a lubricating fluid (e.g., a gas or liquid) provided to an interface between bearing assembly components movable in relation to each other, where the bearing pressure system may be used to maintain a desired pressure range of the lubricating fluid. The lubricating fluid may be sealed within the interface between movable components of the bearing assembly, for example, using one or more sealing elements at the interface. However, due to factors such as leaks and changes in the environment in which the bearing assembly is disposed (e.g., environmental temperature and pressure changes), the pressure of the fluid within the bearing assembly may fluctuate. A bearing pressure system in accordance with one or more embodiments disclosed herein may be used in conjunction with the bearing assembly to maintain the desired pressure range of the fluid within the bearing assembly.

Bearing pressure systems disclosed herein may include one or more accumulators in fluid communication with a bearing assembly to provide pressurized fluid to the bearing assembly (or collect fluid from the bearing assembly) in order to maintain the desired pressure range of the fluid within the bearing assembly. As used herein, an accumulator may refer to a chamber used for containing pressurized fluid. An accumulator may initially be filled with an amount of the fluid used in the bearing assembly (e.g., lubricating fluid) and pressurized, and thus, the fluid in the accumulator may be referred to as pressurized fluid. However, during operation of the bearing pressure system, the relative pressure of the pressurized fluid in an accumulator and of the fluid in the bearing assembly may change. For example, in some embodiments, pressure of the pressurized fluid in an accumulator may fall below the pressure of the fluid in an associated bearing assembly during operation of the bearing assembly. However, because fluid contained in an accumulator may initially be pressurized to a relatively higher pressure, the fluid in the accumulator may be referred to as "pressurized fluid" to distinguish fluid that is contained in an accumulator from fluid that is in a bearing assembly.

Pressurized fluid within an accumulator may be pressurized using one or more sources of stored energy within the accumulator. For example, in some accumulators, a bladder of compressible fluid (liquid or gas) pre-charged to a certain pressure may be provided within the accumulator, where the filled bladder may be compressed by the pressurized fluid within the accumulator, thereby providing a source of stored energy to the pressurized fluid. In some accumulators, a diaphragm or flexible partition may be disposed within the accumulator to separate a pre-charged compressible fluid (liquid or gas) from the pressurized fluid, where the pre-charged compressible fluid provides the source of stored energy to the pressurized fluid. In some accumulators, one or more springs supporting a partition may be provided within the accumulator to provide the source of stored energy to the pressured fluid. Other types of accumulators, including other types of stored energy, may be used for containing pressurized fluid in bearing pressure systems of the present disclosure.

According to embodiments of the present disclosure, a bearing pressure system may include a bearing assembly having a first component movable against a second component, a fluid (e.g., lubricating fluid) provided at an interface between the first and second components (i.e., a bearing assembly interface), and at least one accumulator (having a pressurized fluid therein) in communication with the interface. Communication between an accumulator and a bearing assembly interface may be controlled or restricted, such that fluid may be transferred between the accumulator and interface when preselected conditions are met, e.g., at a preselected pressure differential between the accumulator and the interface, or when the pressure of fluid at the interface drops below a preselected pressure range. For example, accumulator(s) in a bearing pressure system may contain an amount of fluid pressurized to a pressure greater than the fluid disposed at the interface of the bearing assembly. When the pressure of the pressurized fluid within an accumulator becomes lower than the pressure of the fluid disposed at the interface of the bearing assembly (either due to a drop in pressure of the pressurized fluid in the accumulator or due to an increase in pressure of the fluid at the interface of the bearing assembly), one or more steps may occur (automatically or manually) to return to a bearing pressure system configuration having an accumulator with pressurized fluid at a pressure greater than the pressure of fluid at an interface of a bearing assembly.

One or more accumulators may be in communication with a bearing assembly via one or more communication lines, which may be operable (selectively opened and closed) using one or more valves, e.g., pilot operated check valves, pressure relief valves, check valves, and differential pressure valves, and pressure compensators.

A check valve (also referred to as a non-return or one-way valve) may allow a fluid (liquid or gas) to flow through a communication line in a single direction. Check valves may include two ports, an inlet and an outlet, and a movable component therebetween to open or close flow between the two ports. The minimum upstream pressure that opens the movable component may be referred to as the check valve's cracking pressure. A check valve may be designed to have a preselected cracking pressure to automatically open or close the check valve upon having a fluid with the preselected cracking pressure at a port of the check valve.

A variety of types of check valves having a variety of sizes may be suitable for use in bearing pressure assemblies of the present disclosure. For example, a check valve may include a clapper movable component that hangs from a hinge, where the spring constant of the hinge is set to allow rotation of the clapper at a preselected cracking pressure of fluid entering an entry port of the check valve. When pressure of the fluid entering the entry port of the check valve falls below the preselected cracking pressure, the clapper returns to the close position, thereby preventing backflow of the fluid. Further, the degree of the opening of a check valve movable component may correspond with the flow rate of fluid flowing through the check valve. For example, in some check valves, the higher the flow rate of fluid flowing through the check valve, the larger the opening of the check valve may be until it reaches its maximum or fully open position.

Other suitable check valves that may be used in bearing pressure systems of the present disclosure may include, for example, swing or tilting disc check valves, ball check valves, stop-check valves (check valves having an external control mechanism that allows the check valve to be closed regardless of fluid flow pressure), duckbill check valves, and lift or in-line check valves.

Pressure relief valves are valves that may control or limit the pressure build up in a communication line or body. Suitable pressure relief valves for use in bearing pressure systems of the present disclosure may include differential pressure relief valves or other pressure relief valves designed or set to open at a predetermined differential pressure between an inlet of the pressure relief valve and an outlet of the pressure relief valve. When the predetermined differential pressure is exceeded, a movable component within the pressure relief valve may be opened to allow fluid to flow through the pressure relief valve from the inlet to the outlet, to maintain a minimum pressure differential between the inlet and outlet of the pressure relief valve. As the fluid flows through the pressure relief valve, the pressure at the inlet of the pressure relief valve may decrease and the pressure at the outlet of the pressure relief valve may increase until the preselected differential pressure between the inlet and outlet is reached, at which point the movable component may close the pressure relief valve.

Pilot operated check valves ("POCV") suitable for use in bearing pressure systems of the present disclosure include check valves that can be opened by an external pilot pressure. The movable component within the pilot operated check valve remains closed, preventing fluid flow between opposite ports of the check valve, until an external pilot pressure (e.g., provided through a pilot line) applies an activation pressure to open the movable component, thereby allowing fluid flow through the check valve. In some pilot operated check valves, a pilot piston may be provided in a chamber of the pilot operated check valve, where the pilot piston may be connected to and moves the movable component open or closed within the check valve. The pilot piston may have a greater area than the area of the movable component exposed to the outlet port of the check valve to allow a relatively lower pilot pressure to open the check valve against a relatively higher backpressure.

Pressure compensators suitable for use in bearing pressure systems of the present disclosure may include a reducer or component that reduces the inner diameter of a communication line from a larger bore to a smaller bore and a piston disposed therein. The piston may be disposed in the larger bore of the pressure compensator component, the piston having a side facing an opening to the larger bore and an opposite side facing an opening to the smaller bore. Pressure applied to the side facing the larger bore opening may be transferred through the piston into the smaller bore. When the volume within the smaller bore is smaller than that within the larger bore, the smaller bore volume may have a pressure greater than that of the larger bore volume by a factor related to the area of the piston sides and the volumes of the larger and smaller bores. For example, in some embodiments, a pressure compensator may have a smaller bore opening to a pilot line and a larger bore opening to a pressure source (e.g., wellbore pressure in which a bearing assembly may be disposed), where the pilot line extends to a pilot operated check valve. The size of a piston disposed in the pressure compensator and the difference in volume between the smaller bore and larger bore may be designed to provide a smaller bore pressure greater than the larger bore pressure by a predetermined amount. For example, a ratio of pressure generated by the pressure compensator to the pressure of the pressure source may be greater than 3:2, greater than 2:1, or greater than 5:2. By providing a pressure generated by the pressure compensator greater than the pressure of the pressure source to a pilot line in a bearing pressure system, the pilot operated check valve may be activated before the pressure source reaches the activation pressure.

Figure 6:
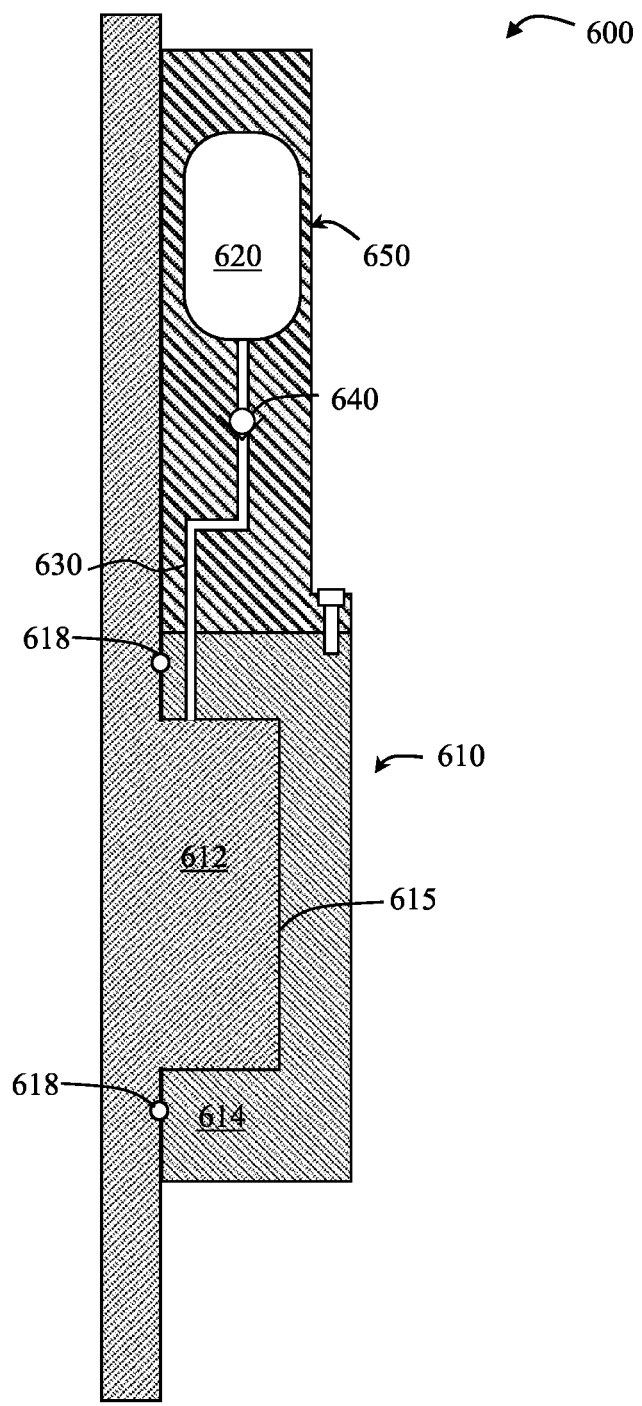
FIG. 6 shows a cross-sectional schematic view of a bearing pressure system according to embodiments of the present disclosure.

A cross sectional and partial view of a bearing pressure system according to embodiments of the present disclosure is shown in FIG. 6. The bearing pressure system 600 includes a bearing assembly 610 in fluid communication with an accumulator 620. The bearing assembly 610 includes a first component 612 rotatable within a second component 614, an interface 615 between the first and second components 612, 614, and a pair of seals 618 sealing fluid at the interface 615. A fluid communication line 630 extends from the accumulator 620 to the interface 615, and a valve 640 is disposed on the communication line 630 to controllably allow or restrict flow of fluid between the accumulator 620 and the bearing assembly 610. For example, the valve 640 may be preset to open when pressure of the fluid at the interface 615 falls below a preselected value or when the pressure difference between the pressurized fluid in the accumulator 620 and the fluid at the interface 615 reaches a preselected value. The accumulator 620 is disposed within a tank housing 650, which may be secured to the bearing assembly 610 (as shown) or formed integrally with a component of the bearing assembly.

In the embodiment shown, the communication line 630 between the accumulator 620 and the interface 615 is operable (opened to allow fluid flow or closed) via a single valve 640. In other embodiments, multiple valves may be disposed along one or more communication lines 630 within the bearing pressure system to maintain a pressure range of the fluid in a bearing assembly. Further, in the embodiment shown in FIG. 6, a bearing pressure system 600 includes a single accumulator 620 to maintain a pressure range of fluid at the interface 615 of the bearing assembly 610. However, other embodiments may include more than one accumulator to maintain a pressure range of fluid at an interface of a bearing assembly.

For example, a schematic of a bearing pressure system according to embodiments of the present disclosure is shown in FIG. 1, where the bearing pressure system includes more than one accumulator to maintain a pressure range of fluid at an interface of a bearing assembly. As shown, the bearing pressure system 100 may include a plurality of communication lines that are selectively openable and closable to transfer or prevent transfer of pressurized fluid between a high pressure accumulator 120, a low pressure accumulator 130 and an interface between components movable relative to each other in a bearing assembly 110. As used herein, "high pressure" and "low pressure" accumulators may refer to accumulators pressurized at relatively higher and lower pressures when compared with each other. In some embodiments, bearing pressure systems may include a first, second, third, etc. accumulator, where each of the accumulators may be pressurized at equal or different pressures when compared with the other accumulators in the bearing pressure system.

The bearing pressure system 100 may be described with reference to a high pressure portion, a low pressure portion, and an activation portion. The high pressure portion includes the high pressure accumulator 120, a pressure operated line 122 extending from the high pressure accumulator 120 to an interface between the bearing assembly components movable relative to each other, a pilot operated check valve 124 disposed along the pressure operated line 122, a high pressure accumulator line 126 extending from the high pressure accumulator 120 to the interface, and a high pressure check valve 128 disposed along the high pressure accumulator line 126. In some embodiments, a bearing pressure system may include more than one high pressure accumulator, where each high pressure accumulator may be in communication with the interface between the bearing assembly components movable relative to each other via a high pressure accumulator line having a high pressure check valve disposed along the high pressure accumulator line.

The low pressure portion includes the low pressure accumulator 130, a low pressure accumulator line 132 extending from the low pressure accumulator 130 to the interface between the bearing assembly components movable relative to each other, and a low pressure check valve 134 disposed along the low pressure accumulator line 132. In some embodiments, a bearing pressure system may include more than one low pressure accumulator, where each low pressure accumulator may be in communication with the interface between the bearing assembly components movable relative to each other via a low pressure accumulator line having a low pressure check valve disposed along the low pressure accumulator line. Further, the low pressure check valve 134 may be designed or set to have a lower cracking pressure than the high pressure check valve 128.

The activation portion includes a pressure compensator 140 having an inlet port 141 and an outlet port 142 and a pilot line 144 extending from the outlet port 142 of the pressure compensator 140 to the pilot operated check valve 124. The inlet port of the pressure compensator 140 opens to a pressure source, which may be provided by the environment in which the bearing assembly is disposed. For example, in embodiments where the bearing pressure system is used with a bearing assembly disposed downhole in a wellbore, the pressure source may be the wellbore pressure. The pressure compensator 140 may be designed to have a relatively greater pressure at the outlet port 142 than the pressure source provided at the inlet port 141. To produce a relatively greater pressure at the outlet port 142, the pressure compensator 140 may have a piston disposed within an inner chamber, where one side of the piston faces the inlet port and the opposite side of the piston faces the outlet port, and where the inner chamber has a first inner diameter larger than a second inner diameter of the outlet port 142. The pressure source provided at the inlet port 141 may exert a force on the piston that moves the piston towards the outlet port 142, thereby compressing the volume in the outlet port 142 and resulting in an increased pressure at the outlet port 142.

A pressure relief line 150 extends from the low pressure accumulator to the high pressure accumulator, where a pressure relief valve 152 disposed along the pressure relief line 150 selectively opens and closes the pressure relief line 150. In embodiments having more than one high pressure accumulator and low pressure accumulator, more than one pressure relief line may be used to connect the multiple high and low pressure accumulators.

Bearing pressure systems may be used with different types of bearing assemblies, for example, roller bearing assemblies, ball bearings, journal bearings, tilt-pad bearings, and other bearing assemblies capable of supporting rotational and thrust loads. In some embodiments, bearing pressure systems may be used with bearing assemblies having a first component movable with respect to a second component, and in some embodiments, with bearing assemblies having more than two components movable relative to each other. Bearing pressure systems of the present disclosure may be used with such bearing assemblies to maintain a pressure range of fluid disposed within the interface(s) between the bearing assembly components.

Figure 2:
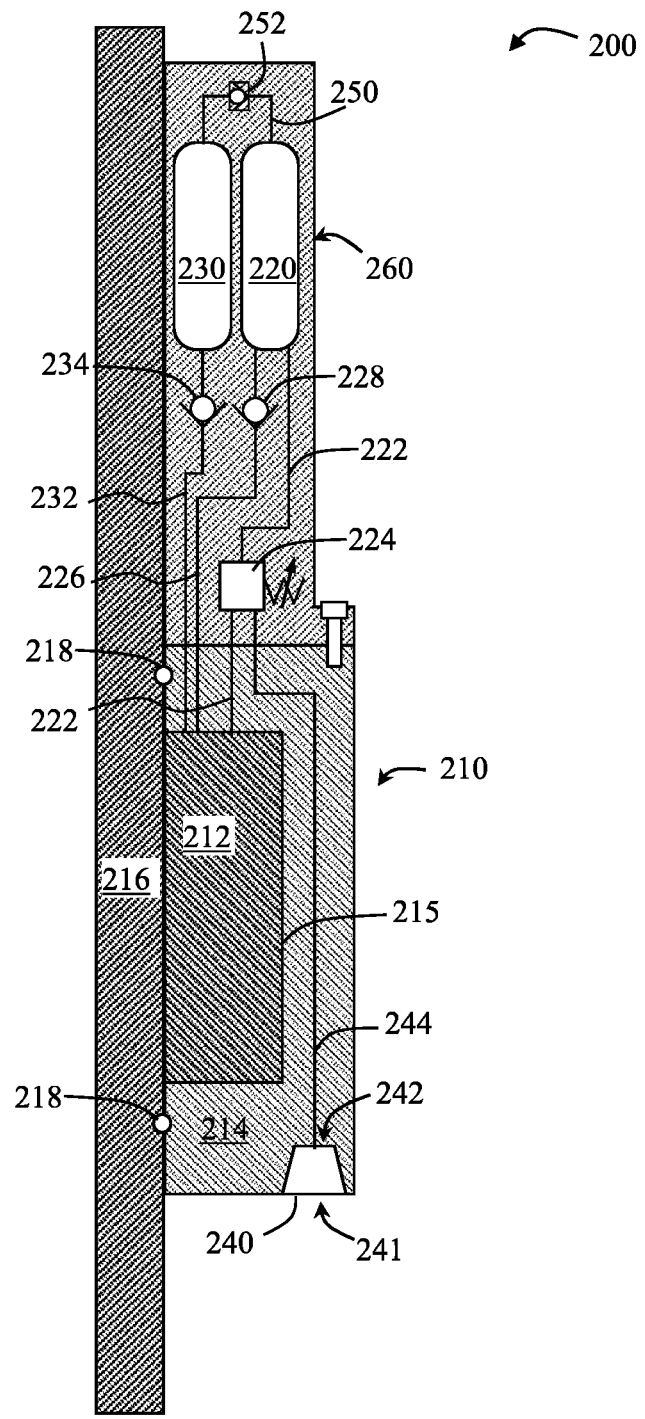
FIG. 2 shows a cross-sectional schematic view of a bearing pressure system according to embodiments of the present disclosure.

For example, FIG. 2 shows a cross-sectional schematic view of a bearing pressure system 200 used to maintain a pressure range of fluid provided to an interface 215 between a first component 212 movable with respect to a second component 214 in a bearing assembly 210. In the embodiment shown, the first component 212 is a rotatable drive ring and the second component 214 is a bearing housing, where the bearing housing may be in a fixed position and the rotatable drive ring is rotatable within the bearing housing. However, in other embodiments, the bearing pressure system 200 may be used to maintain a fluid pressure range within a different type of bearing assembly. A third component 216 may be adjacent the bearing assembly 210, where two sealing elements 218 are disposed between the third component 216 and the bearing assembly 210 (axially above and below the first component 212) to seal fluid within the interface 215 between the first and second components 212, 214 and between the first and third components 212, 216.

The bearing pressure system 200 includes a plurality of communication lines communicating between at least one high pressure accumulator 220, at least one low pressure accumulator 230, and a pressure compensator 240. The communication lines may be controllably operable (opened to allow fluid to flow therethrough and closed to prevent fluid flow therethrough) to either increase or decrease the pressure of fluid provided to the interface 215 of the bearing assembly 210 using a plurality of valves. The valves include different types of valves that are designed to automatically operate (to open or close) at selected pressures. The locations of the valves are further selected to control which communication line is opened or closed at the selected pressures in order to maintain a pressure range within the bearing assembly. In other words, a type of valve designed to automatically operate at a selected pressure is selected for each communication line in the bearing pressure system 200 to maintain the pressure range of the fluid within the bearing assembly 210. The selected pressures for operation of the valves and the pressure range being maintained within the bearing assembly may be selected to suit different bearing assemblies being used for different applications.

The communication lines include a high pressure accumulator line 226 extending from the high pressure accumulator 220 to the interface 215, a low pressure accumulator line 232 extending from the low pressure accumulator 230 to the interface 215, a pressure relief line 250 extending from the low pressure accumulator 230 to the high pressure accumulator 220, a pressure operated line 222 extending from the high pressure accumulator 220 to the interface 215 of the bearing assembly 210, where the pressure operated line 222 is operable by a pilot operated check valve 224, and a pilot line 244 extending from the pressure compensator 240 to the pilot operated check valve 224.

The valves include the pilot operated check valve 224, a high pressure check valve 228 disposed along the high pressure accumulator line 226, a low pressure check valve 234 disposed along the low pressure accumulator line 232, and a pressure relief valve 252 disposed along the pressure relief line 250. The valves are designed to operate at selected pressures based on the selected pressure range being maintained in the bearing assembly 210 and based on the type of communication line on which they are disposed. For example, because the low pressure check valve 234 operates the low pressure communication line 232 (e.g., to supply fluid at a relatively low pressure to a bearing assembly interface) and the high pressure check valve 228 operates the high pressure communication line 226 (e.g., to relieve built up relatively high pressure in a bearing assembly interface), the cracking pressure of the low pressure check valve 234 is lower than the cracking pressure of the high pressure check valve 228. The activation pressure of the pilot operated check valve 224 may be selected to open the pressure operated line 222 when a pressure source (a pressure of the environment in which the bearing assembly 210 is disposed) reaches above a certain value in order to supply relatively higher pressure fluid from the high pressure accumulator 120 to the bearing assembly interface 215 in order to maintain the preselected fluid pressure range at the interface 215. The pressure relief valve 252 may be activated when a preselected pressure differential between the low pressure accumulator 230 and high pressure accumulator 220 is reached.

The pressure compensator 240 is disposed at an end of the bearing assembly 210, where an inlet port 241 of the pressure compensator 240 is exposed to a pressure source, and where an outlet port 242 of the pressure compensator 240 is in communication with the pilot line 244. The pressure source may be provided by the environment (the pressure of the environment) in which the bearing assembly 210 is disposed.

The low pressure accumulator 230 and high pressure accumulator 220 may be held within a tank housing 260. In the embodiment shown, the tank housing 260 is disposed at an axial end of the bearing assembly opposite from the pressure compensator 240. Depending on the bearing assembly and its application, the tank housing 260 may be a variety of sizes and shapes to fit within the intended application of the bearing assembly and to also allow the desired number of low and high pressure accumulators to fit inside the tank housing. For example, in applications having a bearing pressure system that is infrequently or rarely accessed, many pairs of low and high pressure accumulators and/or relatively large-sized low and high pressure accumulators may be supplied in the tank housing to continuously supply fluid to the bearing assembly without frequently accessing and refilling the fluid. In some embodiments, a tank housing may include a single pair of low and high pressure accumulators, in which case, the tank housing may be relatively smaller than that holding many pairs of low and high pressure accumulators. Further, the low and high pressure accumulators 230, 220 may be arranged in a spaced-apart side-by-side configuration in the tank housing 260, as shown in FIG. 2. In some embodiments, a low pressure accumulator may be spaced apart from a high pressure accumulator in configurations other than side-by-side, e.g., on opposite sides of a tank housing or in separate tank housings. For example, when bearing pressure systems of the present disclosure are used in applications having a tight configuration, with limited access or space, one or more tank housings may be disposed around the bearing assembly to fit within the limited space. In some embodiments, the low and high pressure accumulators may be arranged adjacent to one another (e.g., sharing a wall or each having a wall adjacent to each other without a space there between).

Further, bearing pressure systems according to embodiments of the present disclosure may be used with a bearing assembly in a downhole or subsea tool, which may be subjected to high pressure and high temperature environments. For example, in some embodiments, a tool used in drilling operations may include a bearing assembly having a bearing housing, a drive ring rotatable within the bearing housing, a fluid disposed at an interface between the bearing housing and the drive ring, and one or more accumulators in communication with the interface. Each accumulator may contain an amount of pressurized fluid pressurized to a pressure greater than the fluid disposed at the interface. Further, each accumulator may be in controllable communication with the fluid at the bearing assembly interface via a communication line having a valve disposed thereon to open or restrict fluid flow along the communication line. Tools used in drilling operations and having a bearing pressure system according to embodiments of the present disclosure may include, for example, rotating control devices.

Figure 3:
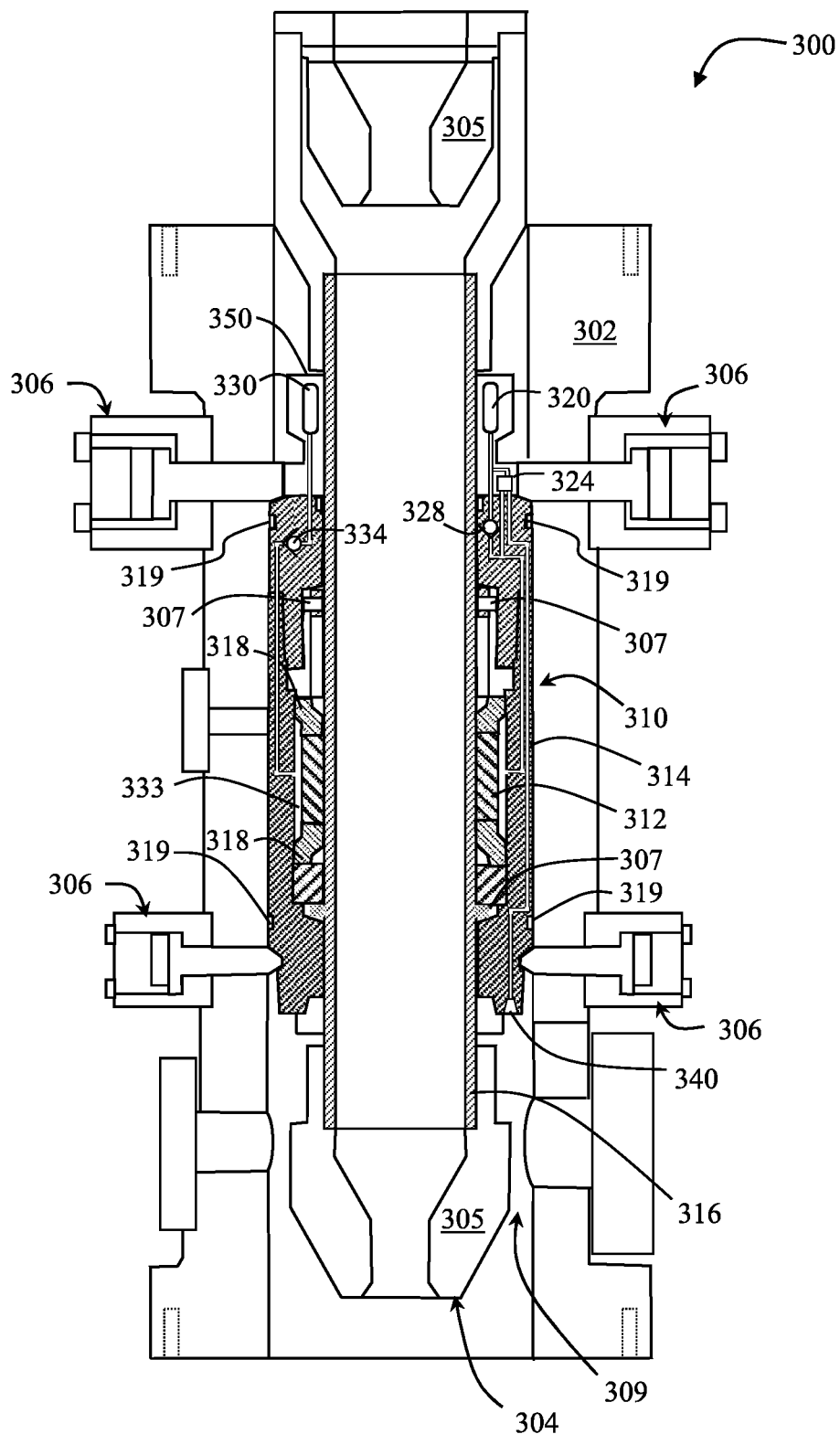
FIG. 3 shows a cross-sectional view of an RCD according to embodiments of the present disclosure.

FIG. 3 shows an example of a rotating control device ("RCD") 300 having a bearing pressure system according to embodiments of the present disclosure. The RCD 300 includes an RCD housing 302, a bearing assembly 310 disposed within an inner bore of the RCD housing 302, and a packing element 304. The RCD housing 302 may include connections at opposite axial ends of the housing for connection to the remainder of a riser assembly (e.g., a slip joint).

The bearing assembly 310 is engaged within the inner bore of the RCD housing 302 and held within the RCD housing 302 using locking assemblies 306 at the axial ends of the bearing assembly 310. The bearing assembly 310 includes an outer housing 314 and an inner rotatable component 312 to allow an inner sleeve 316 to rotate with respect to the outer housing 314. The inner rotatable component 312 may include any type of bearing component capable of supporting rotational and thrust loads, for example, roller bearings, ball bearings, journal bearings, tilt-pad bearings, and/or diamond bearings. The packing element 304 includes at least one stripper rubber 305 attached to the inner sleeve 316. The packing element 304 is engaged within the bearing assembly 310 and held axially in position using a plurality of locking profiles 307 formed along the inner sleeve 316 that are configured to receive locking lugs from the bearing assembly 310.

Seals 318 are positioned around the inner rotatable component 312 to isolate the inner rotatable component from wellbore fluids. Seals 319 are positioned about the periphery of the outer housing 314 so that the bearing assembly 310 may sealingly engage the inner bore of the RCD housing 302. Seals 318 and 319 may include o-ring seals or other types known to one of ordinary skill in the art.

A bearing pressure system according to embodiments of the present disclosure is used to maintain a pressure range of the fluid provided within the bearing assembly 310 (within the interface(s) between components of the bearing assembly 310 and between the seals 318). The bearing pressure system includes a plurality of communication lines communicating between at least one high pressure accumulator 320, at least one low pressure accumulator 330, and a pressure compensator 340, a plurality of valves operating (opening or closing) the communication lines, a tank housing 350 holding the high and low pressure accumulators 320, 330, and the bearing assembly 310 to which fluid is being provided.

The communication lines and valves of the bearing pressure system are disposed within the tank housing 350 and fixed components of the bearing assembly 310, such that the inner rotatable component 312 may rotate or move with respect to the fixed components of the bearing assembly 310 without misaligning or disrupting the bearing pressure system. The communication lines may be formed within the tank housing and/or fixed components of the bearing assembly, such as by drilling a passageway there through, and/or communication lines may include tubular conduits capable of allowing fluid flow. In some embodiments, communication lines may include one or more tubular conduits disposed between adjacent components (along an interface between the adjacent components). In some embodiments, communication lines may include one or more passageways integrally formed (e.g., channels drilled or formed during molding) along an interface between adjacent components of the bearing assembly and/or tank housing. In some embodiments, communication lines may include a combination of tubular conduits communicating with passageways integrally formed within one or more components of the bearing assembly and/or tank housing.

As shown, the communication lines may extend through the tank housing 350 and the outer housing 314 of the bearing assembly 310, from the high and low pressure accumulators 320, 330 to a bearing assembly interface. A high pressure accumulator line extends from the high pressure accumulator 320 to a bearing assembly interface 333, and a low pressure accumulator line extends from the low pressure accumulator 330 to the interface. The high pressure accumulator line has a high pressure check valve 328 disposed thereon to open the high pressure accumulator line when pressure of the fluid in the bearing assembly interface reaches (or to close the high pressure accumulator line when fluid pressure in the interface falls below) a preselected cracking pressure of the high pressure check valve 328. The high pressure check valve 328 may be disposed along the high pressure accumulator line in a fixed component of the bearing assembly 310, as shown in FIG. 3, or in the tank housing 350. The low pressure accumulator line has a low pressure check valve 334 disposed thereon to open the low pressure accumulator line when pressure of the fluid in the bearing assembly interface falls below (or close the low pressure accumulator line when the interface fluid pressure reaches) a preselected cracking pressure of the low pressure check valve 334. The low pressure check valve 334 may be disposed along the low pressure accumulator line in a fixed component of the bearing assembly 310, as shown in FIG. 3, or in the tank housing 350.

A pressure operated line also extends through the tank housing 350 and the outer housing 314 of the bearing assembly, from the high pressure accumulator 320 to the bearing assembly interface. A pilot operated check valve 324 is disposed along the pressure operated line, which operates (open or close) the pressure operated line with an activation pressure provided through a pilot line. The pilot line extends from the pilot operated check valve 324 to a pressure compensator 340 provided at an axial end of the bearing assembly 310 opposite from the tank housing 350. The pressure compensator 340 is positioned at the axial end of the bearing assembly 310 to have an inlet port opening to the annular space 309 between the packing element 304 and the inner bore of the RCD housing 302. The pressure compensator 340 may provide a pressure within the pilot line higher than the pressure within the annular space 309 between the packing element 304 and inner bore of the RCD housing 302.

A pressure relief line (not shown) may extend through the tank housing 350 from the low pressure accumulator 330 to the high pressure accumulator 320. A pressure relief valve activated upon reaching a preselected pressure differential may be disposed on the pressure relief line in order to open the pressure relief line once the pressure differential between the low and high pressure accumulators 330, 320 reaches the preselected pressure differential and close the pressure relief line once the pressure differential between the low and high pressure accumulators 330, 320 falls below the preselected pressure differential.

The tank housing 350 is annularly disposed around the inner sleeve 316 and attached at an upper axial end of the bearing assembly 310, for example, using a threaded connection or by welding. The tank housing may be attached to a fixed component (with respect to a movable component of a bearing assembly) such that communication lines extending through the tank housing and into the fixed component do not misalign. In some embodiments, the tank housing may be formed integrally with the bearing assembly outer housing or other fixed component.

Figure 4:
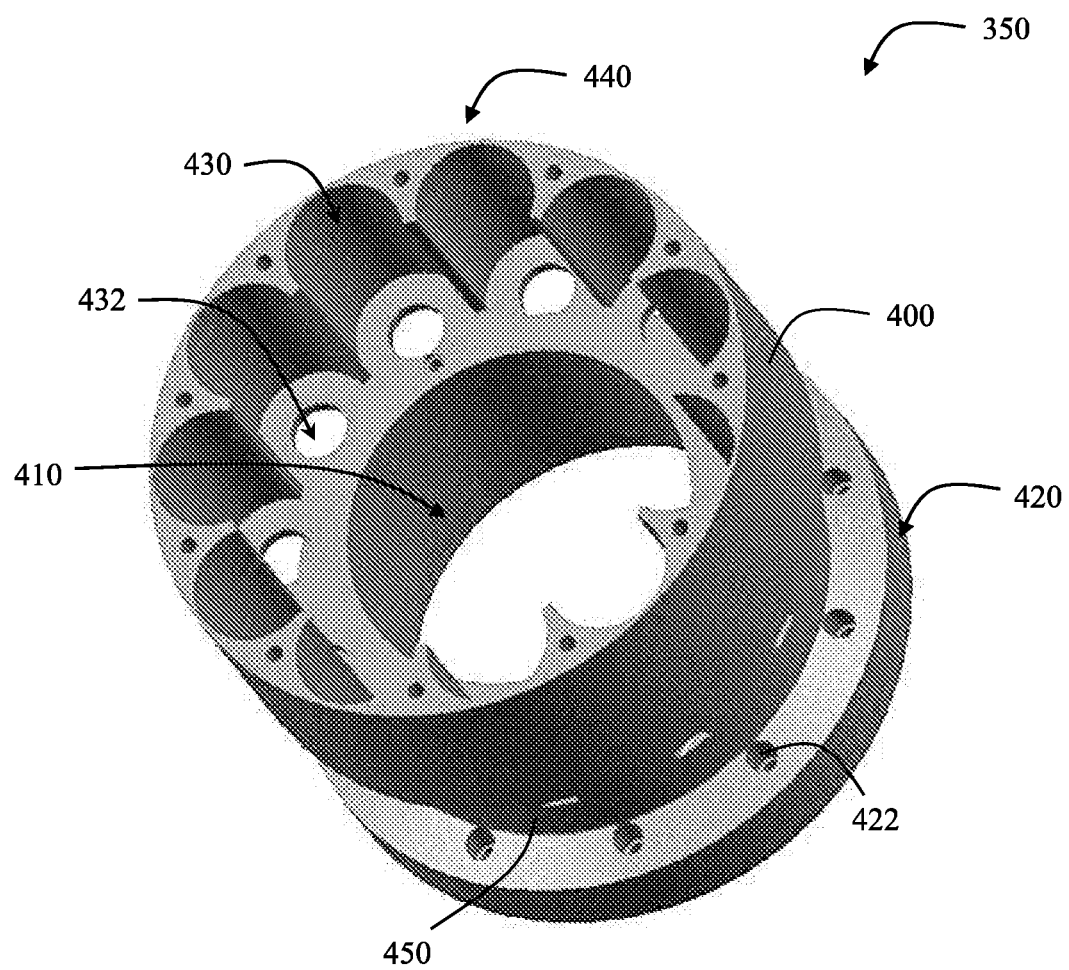
FIG. 4 shows a perspective view of a tank housing according to embodiments of the present disclosure.

A perspective view of the tank housing 350 of FIG. 3 is shown in FIG. 4. The tank housing includes an annular body 400 having a bore 410 extending axially therethrough, an attachment end 420, and a plurality of compartments 430 formed at an opposite axial end 440 from the attachment end 420. The compartments 430 may have a shape and size that negatively corresponds with the shape and size of high and low pressure accumulator tanks being used with a bearing pressure system of the present disclosure. The attachment end 420 may be attached to a bearing assembly using various attachment mechanisms, such as by forming a threaded connection or other interlocking features between the attachment end and the bearing assembly, using screws extending through the attachment end and a portion of the bearing assembly, latches, pins, and welding.

Further, a plurality of passageways may be formed through the body 400 of the tank housing 350, either forming communication lines or to allow communication lines to extend therethrough. For example, as shown in FIG. 4, accumulator holes 432 may be formed at the base of each compartment 430 to allow a communication line to extend through the compartment from the high or low pressure accumulator disposed therein. Attachment end holes 422 may also be formed through the attachment end 420 to allow communication lines (e.g., communication lines extending from the high and low pressure accumulators) to extend through the attachment end to the bearing assembly on which the tank housing is attached.

Valves used in bearing pressure systems of the present disclosure may be disposed in valve compartments formed within the body of the tank housing 350, and/or valves may be disposed around an annular groove 450 formed between the attachment end 420 and the opposite axial end 440 of the tank housing 350. In embodiments having one or more valves disposed around an annular groove formed along the outer surface of a tank housing, the one or more valves may be secured to the tank housing, for example, using a screw or other attachment mechanism.

Figure 5:
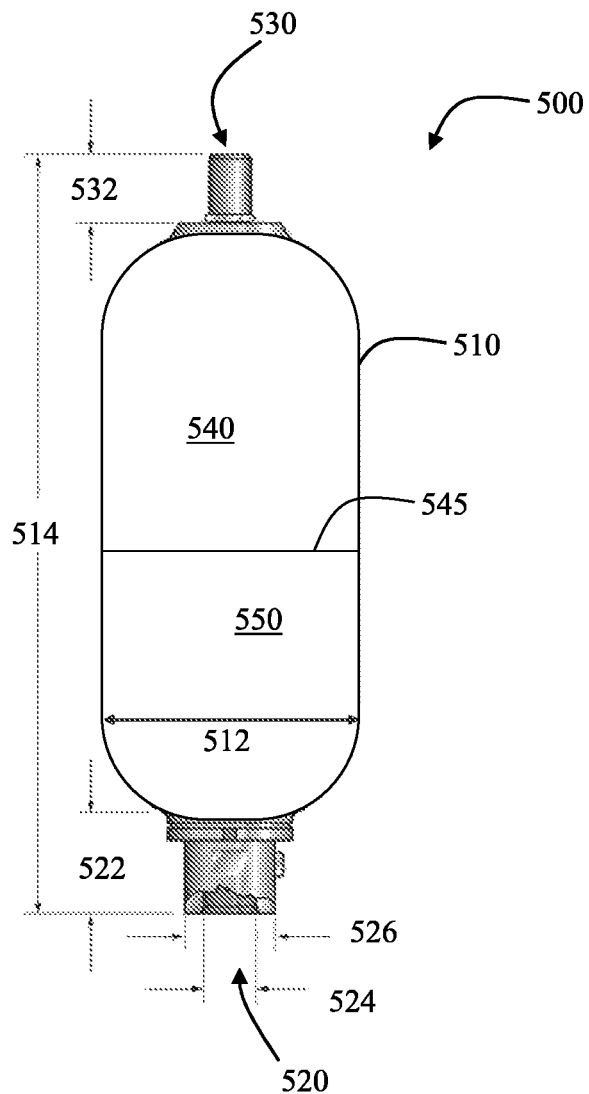
FIG. 5 shows a side view of an accumulator tank according to embodiments of the present disclosure.

FIG. 5 shows a partial cross sectional view of an example of an accumulator 500. The accumulator 500 may hold fluid at various pressures, depending on, for example, the stored energy source and the body material. The accumulator tank 500 has a body 510, which may hold fluid, an outlet 520 extending an outlet length 522 from an axial end of the body 510, and an inlet 530 extending an inlet length 532 from an opposite axial end of the body 510. The body 510 may be divided into two sections, a first section 540 having a stored energy source and a second section 550 holding the pressurized fluid. The stored energy source may be, for example, a compressible fluid pre-charged to a preselected pressure, where the compressible fluid may be contained in a bladder disposed in the first section 540 or may be contained within the first section 540 using a partition 545, for example. In some embodiments, the stored energy source may be a spring having a preselected spring constant, where the spring may push on the partition segmenting the pressurized fluid. The second section 550 of the body 510 may be filled with pressurized fluid, where filling the second section 550 with pressurized fluid may push on the partition 545, thereby compressing the stored energy source.

The pressurized fluid may initially be filled into the second section 550 via the outlet 520. Once the accumulator is installed to the bearing pressure system, the pressurized fluid may be controllably released through the outlet 520 to flow through a communication line. In some embodiments, pressurized fluid may be continuously or periodically supplied back to the second section 550 of the body 510 during operation of the bearing pressure system via the outlet 520, for example, when the pressure of the fluid in the associated bearing assembly is greater than the pressure of the pressurized fluid in the second section or when the difference between the pressure of the fluid in the associated bearing assembly and the pressure of the pressurized fluid falls below a predetermined value.

In some embodiments, pressurized fluid may be supplied from outside the bearing pressure system to fill into the second section. In such embodiments, the outlet of the accumulator may be disconnected from a communication line, where pressurized fluid may be introduced via the outlet, or a second inlet may communicate with the second section, where pressurized fluid may be introduced via the second inlet without disconnecting the outlet 520. In some embodiments, pressurized fluid may be supplied from one accumulator to another accumulator via a pressure relief line extending between and in communication with the second sections of the accumulators. The pressure relief line may have a pressure relief valve configured to open the pressure relief line when a pressure differential between the two accumulators is reached.

Pressurized fluid may be supplied from the accumulator 500 to a bearing pressure system of the present disclosure via the outlet 520. The outlet 520 has an inner diameter 524 defining a conduit, through which fluid may flow, and an outer diameter 526, which may be sized to fit through a passageway or hole formed in a tank housing. In some embodiments, a check valve may be fitted at the outlet 520. The accumulator may further include a body outer diameter 512 (larger than the outer diameters of the inlet 530 and outlet 520) and a total length 514. The body outer diameter 512 may be sized to fit within a compartment in a tank housing according to embodiments of the present disclosure.

According to embodiments of the present disclosure, bearing pressure systems disclosed herein may be provided to maintain a pressure range of a fluid within a bearing assembly. For example, a bearing pressure system provided with a bearing assembly having a first component movable relative to a second component with an interface therebetween may be in communication with the bearing assembly to maintain a pressure range of fluid at the bearing assembly interface, where the bearing pressure system may include one or more accumulators in communication with the bearing assembly interface via one or more communication lines extending from the accumulator(s) to the interface operable by one or more valves. In some embodiments, a bearing pressure system provided with a bearing assembly having a drive ring rotatable within a bearing housing may include a pressure compensator, a high pressure accumulator, a low pressure accumulator, and a plurality of communication lines providing conduits for fluid to flow between the high pressure accumulator, the low pressure accumulator, and the bearing assembly. Communication lines may include a pressure operated line having a pilot operated check valve and extending from the high pressure accumulator to an interface between the bearing housing and the drive ring, a high pressure accumulator line extending from the high pressure accumulator to the interface, a low pressure accumulator line extending from the low pressure accumulator to the interface, a pilot line extending from the pressure compensator to the pilot operated check valve, and a pressure relief line extending from the low pressure accumulator to the high pressure accumulator.

Methods of the present disclosure may include providing a bearing pressure system having a bearing assembly, a fluid disposed at an interface between movable components of the bearing assembly, and at least one accumulator in communication with the interface, where the accumulator(s) include an amount of the fluid pressurized (pressurized fluid) to a pressure greater than the fluid disposed at the interface. A pressure range of the fluid at the interface may be maintained by providing an amount of the pressurized fluid from the accumulator(s) to the interface when pressure of the fluid falls below the pressure range and transferring an amount of the fluid from the interface to the accumulator(s) when pressure of the fluid rises above the pressure range.

In some embodiments, maintaining the pressure range of the fluid within the bearing assembly may include decreasing the amount of fluid within the bearing assembly when pressure of the fluid rises above the pressure range and increasing the amount of fluid within the bearing assembly when pressure of the fluid falls below the pressure range. The detection of fluid pressure above or below the preselected pressure range may automatically occur through use of a plurality of valves disposed along the communication lines, where each valve is configured to operate at a preselected pressure and positioned along the suitable communication line for opening or closing the communication line at the preselected pressure. In other words, the arrangement of valves operable at preselected pressures along a plurality of communication lines is designed to open certain communication lines and close certain communication lines when the fluid within the bearing pressure system reaches the preselected pressure of each valve, the cumulative of which maintains the pressure range of the fluid within the bearing assembly.

For example, the pilot operated check valve in the bearing pressure system may have a set pressure, where the pilot operated check valve may operate when a pressure greater than or equal to the set pressure is supplied to an inlet of the pilot operated check valve. Operation of the pilot operated check valve may include opening the pressure operated line (on which the pilot operated check valve is disposed), where the pilot operated check valve may close the pressure operated line when a pressure less than the set pressure is supplied to the inlet of the pilot operated check valve. By opening the pressure operated line, the pilot operated check valve may be used to increase the amount of fluid in the bearing assembly (to maintain a pressure range within the bearing assembly). A pressurized fluid may be supplied from the pressure compensator to the inlet of the pilot operated check valve via the pilot line. When a pressure greater than or equal to the set pressure is generated from the pressure compensator and provided through the pilot line to the inlet of the pilot operated check valve, the pressure operated line may be opened to provide fluid from the high pressure accumulator to an interface between the bearing housing and the drive ring.

In some embodiments, the amount of fluid within the bearing assembly may be increased by controllably supplying fluid from a low pressure accumulator to the bearing assembly via a low pressure accumulator line, operable with a low pressure check valve disposed along the low pressure accumulator line. A cracking pressure of the low pressure check valve may be set to a value equal to or close to (e.g., within 5 percent or within 10 percent) a minimum pressure of the pressure range being maintained within the bearing assembly. When the fluid in the bearing assembly has a pressure less than the minimum pressure of the pressure range, or less than the cracking pressure, the low pressure check valve opens the low pressure accumulator line, thereby allowing fluid from the low pressure accumulator to flow to the bearing assembly until pressure in the bearing assembly reaches the cracking pressure.

The amount of fluid within the bearing assembly may be decreased (to decrease the bearing assembly fluid pressure) by controllably supplying fluid from the bearing assembly to a high pressure accumulator via a high pressure accumulator line, operable with a high pressure check valve disposed along the high pressure accumulator line. A cracking pressure of the high pressure check valve may be set to a value equal to or close to (e.g., within 5 percent or within 10 percent) a maximum pressure of the pressure range being maintained within the bearing assembly. When the fluid in the bearing assembly has a pressure greater than the maximum pressure of the pressure range, or greater than the cracking pressure, the high pressure check valve opens the high pressure accumulator line, thereby allowing fluid from the bearing assembly to flow to the high pressure accumulator until pressure in the bearing assembly falls below the cracking pressure.

When the fluid pressure in the low pressure accumulator decreases below a certain amount, fluid may be supplied from a high pressure accumulator via a pressure relief line, or conversely if fluid pressure in a high pressure accumulator decreases below a certain amount, fluid may be supplied from the low pressure accumulator via the pressure relief line. A pressure relief valve may be disposed on the pressure relief line to open the pressure relief line when a difference in pressure between the high pressure accumulator and the low pressure accumulator reaches a predetermined value.

Methods of the present disclosure may include maintaining a pressure range in a bearing assembly disposed in a wellbore. The pressure range being maintained may have a minimum pressure greater than a wellbore pressure. When the wellbore pressure increases to a certain amount, the pressure may activate a pilot operated check valve (e.g., overcome springs used to activate the pilot operated check valve) disposed on a pressure operated line in communication with a high pressure accumulator and an interface in the bearing assembly. The pilot operated check valve may be activated via a pilot line opening directly to the wellbore environment (and thus in fluid communication with the wellbore pressure) or via a pressure compensator opening to the wellbore environment, where the pressure compensator may generate a pressure greater than the wellbore pressure to a pilot line in communication with the pilot operated check valve.

Once the pilot operated check valve is activated, the pilot operated check valve may open the pressure operated line to allow fluid to flow from the high pressure accumulator to the bearing assembly interface. In other words, the pilot operated check valve may separate a high pressure accumulator from the bearing assembly, and once opened, the pilot operated check valve may allow fluid communication between the high pressure accumulator and the bearing assembly.

If there is insufficient pressure to activate the pilot operated check valve, but the bearing assembly fluid pressure falls below the desired pressure range being maintained, fluid may be provided from one or more low pressure accumulators, such as described above. If fluid pressure drops below a certain amount in a low pressure accumulator and creates a pressure differential along a pressure relief line extending between the low pressure accumulator and a high pressure accumulator, a pressure relief valve disposed along the pressure relief line may open to allow fluid to transfer from the high pressure accumulator to the low pressure accumulator.

As the bearing assembly operates downhole, fluid in the bearing assembly may expand, thereby increasing fluid pressure in the bearing assembly. The high fluid pressure in the bearing assembly may be decreased via a high pressure accumulator line in communication with the bearing assembly and a high pressure accumulator. As described above, a high pressure check valve set at a cracking pressure may separate the bearing assembly fluid from the high pressure accumulator. When fluid pressure in the bearing assembly increases above the cracking pressure, the high pressure check valve may open, allowing fluid to flow from the bearing assembly to the high pressure accumulator.

Accordingly, methods of the present disclosure may be used to maintain a pressure range of fluid within a bearing assembly when the bearing assembly is operating in relatively high wellbore pressure and when the bearing assembly is operating in relatively low wellbore pressure. Although examples of using bearing pressure systems of the present disclosure with a rotating control device have been described herein, bearing pressure systems of the present disclosure may be used with other downhole or wellbore operational tools having bearing assemblies. Further, methods of the present disclosure may be used with bearing assemblies operating in environments outside of a wellbore, where a pressure range of fluid within the bearing assembly being maintained may be selected based on the environmental pressure in which the bearing assembly is disposed. For example, bearing pressure systems of the present disclosure may be used with a bearing assembly located above the surface of a formation.

Although only a few example embodiments have been described in detail above, those skilled in the art will readily appreciate that many modifications are possible in the example embodiments without materially departing from the scope of this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

What is claimed is:

1. A bearing pressure system, comprising:
   a bearing assembly comprising a first component movable against a second component;
   at least one accumulator in fluid communication with an interface between the first and second components, the at least one accumulator comprising a pressurized fluid, a first accumulator, and a second accumulator pressurized to a greater amount than the first accumulator, wherein the first accumulator is in fluid communication with the interface via a first accumulator line, and the second accumulator is in fluid communication with the interface via a second accumulator line;
   a pressure operated line extending from the second accumulator to the interface;
   a pilot operated check valve disposed along the pressure operated line;
   a pressure compensator; and
   a pilot line extending from the pressure compensator to the pilot operated check valve.

2. The bearing pressure system of claim 1, wherein the first accumulator and the second accumulator are in controllable fluid communication via a pressure relief line.

3. The bearing pressure system of claim 1, wherein each of the first accumulator line and the second accumulator line is operable by a valve.

4. A tool, comprising:
   a first accumulator;
   a second accumulator;
   a bearing assembly, comprising:
     a bearing housing;
     a drive ring rotatable within the bearing housing, wherein an interface between the bearing housing and the drive ring is in fluid communication with the first accumulator and the second accumulator;
     a first accumulator line extending from the first accumulator to the interface, the first accumulator line operable by a first check valve; and
     a second accumulator line extending from the second accumulator to the interface, the second accumulator line operable by a second check valve, and the second check valve having a cracking pressure greater than the first check valve; and
   a fluid communicable between the first accumulator and the second accumulator and the interface, wherein a pressure of the fluid in the first accumulator and the second accumulator is greater than a pressure of the fluid at the interface.

5. The tool of claim 4, further comprising a tank housing disposed at a first axial end of the bearing housing, wherein the at least one first accumulator and the second accumulator are disposed in the tank housing.

6. The tool of claim 5, wherein the tank housing comprises an annular body having a plurality of compartments formed therein, each of the first accumulator and the second accumulator disposed in a respective one of the compartments.

7. The tool of claim 5, wherein the tank housing is integrally formed with the bearing housing at the first axial end.

8. The tool of claim 4, further comprising a pressure relief line extending between the first and second accumulators, the pressure relief line operable by a pressure relief valve.

9. The tool of claim 4, further comprising:
a pressure operated line extending from the second accumulator to the interface, the pressure operated line operable by a pilot operated check valve disposed along the pressure operated line;
a pressure compensator; and
a pilot line extending from the pressure compensator to the pilot operated check valve.

10. The tool of claim 9, wherein the pilot operated check valve is set to an activation pressure and operatively activated by a pressure source exterior to the bearing assembly.

11. The tool of claim 4, wherein the tool is a rotating control device.

12. A method, comprising:
providing a bearing pressure system comprising:
a bearing assembly comprising a first component movable against a second component;
a first accumulator in communication with an interface between the first and second components;
a second accumulator in communication with the interface between the first and second components;
a fluid communicable between the first accumulator and the second accumulator and the interface, wherein the fluid in the first accumulator and the second accumulator is pressurized to a pressure greater than a pressure of the fluid at the interface;
a pressure compensator; and
a plurality of communication lines comprising:
a first accumulator line extending from the first accumulator to the interface;
a second accumulator line extending from the second accumulator to the interface;
a pressure operated line having a pilot operated check valve and extending from the second accumulator to the interface;
a pilot line extending from the pressure compensator to the pilot operated check valve; and
a pressure relief line extending from the first accumulator to the second accumulator; and
maintaining a pressure range of the fluid at the interface, the maintaining comprising:
providing an amount of the pressurized fluid from at least one of the first accumulator and the second accumulator to the interface when the pressure of the fluid at the interface falls below the pressure range; and
transferring an amount of the fluid from the interface to the at least one second accumulator when the pressure of the fluid at the interface rises above the pressure range.

13. The method of claim 12, wherein the bearing pressure system is in a wellbore and wherein the pressure range has a minimum pressure greater than a wellbore pressure.

14. The method of claim 12, wherein the pilot operated check valve has a set pressure, and wherein providing the amount of pressurized fluid comprises:
generating pressure from the pressure compensator greater than the set pressure; and
opening the pressure operated line to provide pressurized fluid from the second accumulator to the interface.

15. The method of claim 12, wherein providing the amount of pressurized fluid comprises setting a cracking pressure of a first check valve disposed along the first accumulator line to a minimum pressure of the pressure range, wherein the first check valve opens the first accumulator line when the fluid at the interface has a pressure less than the minimum pressure of the pressure range.

16. The method of claim 12, wherein transferring the amount of fluid comprises setting a cracking pressure of a second check valve disposed along a second accumulator line to a maximum pressure of the pressure range, wherein the second check valve opens the second accumulator line when the fluid at the interface has a pressure greater than the maximum pressure of the pressure range.

* * * * *